(12) United States Patent
Oka

(10) Patent No.: US 7,706,009 B2
(45) Date of Patent: Apr. 27, 2010

(54) IMAGE PRINTING CONTROL APPARATUS AND IMAGE PRINTING CONTROL METHOD

(75) Inventor: Koji Oka, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 1037 days.

(21) Appl. No.: 11/334,593

(22) Filed: Jan. 19, 2006

(65) Prior Publication Data
US 2006/0197976 A1 Sep. 7, 2006

(30) Foreign Application Priority Data
Mar. 3, 2005 (JP) ............................. 2005-058743
Dec. 5, 2005 (JP) ............................. 2005-350197

(51) Int. Cl.
*G06F 15/00* (2006.01)
*H04N 5/225* (2006.01)
(52) U.S. Cl. .................................. 358/1.15; 348/207.2
(58) Field of Classification Search ................ 358/1.15, 358/1.18, 1.8, 1.1, 1.9, 498, 296, 518, 1.13, 358/483, 505, 509; 348/207.2, E5.024, 333.01, 348/345, 207.99, 222.1, 231.3, 239, 374; 710/23, 260; 400/62, 613; 235/475, 483, 235/454, 492, 462.01; 355/18, 72; 396/239, 396/310, 429
See application file for complete search history.

(56) References Cited

U.S. PATENT DOCUMENTS

2005/0024497 A1* 2/2005 Sakamoto et al. ........ 348/207.2
2006/0139402 A1 6/2006 Nakashima

FOREIGN PATENT DOCUMENTS

| EP | 0 859 326 A2 | 8/1998 |
|---|---|---|
| JP | 05-095492 | 4/1993 |
| JP | 5-95492 | 4/1993 |
| JP | 10-181142 | 7/1998 |
| JP | 2000-50052 | 2/2000 |
| JP | 2000-059723 | 2/2000 |
| JP | 2000-59723 | 2/2000 |
| JP | 2000-341516 | 12/2000 |
| JP | 2001-113803 | 4/2001 |
| JP | 2003-283860 | 10/2003 |
| JP | 2004-9388 | 1/2004 |
| JP | 2004-15234 | 1/2004 |
| JP | 2004-96761 | 3/2004 |
| JP | 2004-096761 | 3/2004 |
| JP | 3530847 | 3/2004 |
| JP | 2004-172957 | 6/2004 |
| JP | 2004-274093 | 9/2004 |
| JP | 2005-28730 | 2/2005 |

(Continued)

*Primary Examiner*—Saeid Ebrahimi Dehkordy
(74) *Attorney, Agent, or Firm*—Oblon, Spivak, McClelland, Maier & Neustadt, L.L.P.

(57) ABSTRACT

A printing control apparatus includes an image pickup unit, a storing unit, a receiver, a display unit, a selector, a communicator, and a control unit therefor. The control unit is configured to calculate the number of image data possible to be included in printing control information based on at least one item in a power value received from a printing device and selected by the selector, the image data selected by the selector and a capacity of a memory used for communication of the printing control apparatus or/and the printing device, and to generate at least one printing control information according to the calculated number of the image data.

17 Claims, 16 Drawing Sheets

FOREIGN PATENT DOCUMENTS

| | | |
|---|---|---|
| JP | 2005-028730 | 2/2005 |
| JP | 2005-94700 | 4/2005 |
| JP | 2005-094700 | 4/2005 |
| JP | 2005-109920 | 4/2005 |
| JP | 2005-151521 | 6/2005 |

* cited by examiner

FIG. 4A

```
<printRequest>
    <listLayout>
                    <6 Frames/>
    </listLayout>
    <printFile>
            RIMG0001.JPG
            RIMG0002.JPG
            RIMG0003.JPG
            RIMG0004.JPG
            RIMG0005.JPG
            RIMG0006.JPG
            RIMG0007.JPG
            RIMG0008.JPG
            RIMG0009.JPG
            RIMG0010.JPG
            RIMG0011.JPG
            RIMG0012.JPG
    </printFile>
</printRequest>
```

FIG. 6A

```
Image Files to be Printed
  |RIMG0001.jpg| 4 Copies
  |RIMG0002.jpg| 6 Copies
  |RIMG0003.jpg| 8 Copies
  |RIMG0004.jpg| 6 Copies
```

FIG. 6B

```
                                              A
<printRequest>
        <listLayout>
                <6 Frames/>
        </listLayout>
        <printFile>
                RIMG0001.JPG<4 Copies/>
                RIMG0002.JPG<6 Copies/>
                RIMG0003.JPG<2 Copies/>
        </printFile>
</printRequest>
```

FIG. 6C

```
                                              B
<printRequest>
        <listLayout>
                <6 Frames/>
        </listLayout>
        <printFile>
                RIMG0003.JPG<6 Copies/>
                RIMG0004.JPG<6 Copies/>
        </printFile>
</printRequest>
```

FIG. 7A

```
<printRequest>
          <printNO>                401
                    <001>
          <printNO>
          <listLayout>
                    <6 Frames/>
          </listLayout>
          <printFile>
                    RIMG0001.JPG
                    RIMG0002.JPG
                    RIMG0003.JPG
                    RIMG0004.JPG
                    RIMG0005.JPG
                    RIMG0006.JPG
          </printFile>
</printRequest>
```

FIG. 7B

```
<printRequest>
          <printNO>                402
                    <007>
          <printNO>
          <listLayout>
                    <6 Frames/>
          </listLayout>
          <printFile>
                    RIMG0007.JPG
                    RIMG0008.JPG
                    RIMG0009.JPG
                    RIMG0010.JPG
          </printFile>
</printRequest>
```

FIG. 9A

```
<printRequest>
        <pageNO>                    403
                <001>
        <pageNO>
        <listLayout>
                <6 Frames/>
        </listLayout>
        <printFile>
                RIMG0001.JPG
                RIMG0002.JPG
                RIMG0003.JPG
                RIMG0004.JPG
                RIMG0005.JPG
                RIMG0006.JPG
        </printFile>
</printRequest>
```

FIG. 9B

```
<printRequest>
        <pageNO>                    404
                <002>
        <pageNO>
        <listLayout>
                <6 Frames/>
        </listLayout>
        <printFile>
                RIMG0007.JPG
                RIMG0008.JPG
                RIMG0009.JPG
                RIMG0010.JPG
        </printFile>
</printRequest>
```

FIG. 11A

```
<printRequest>
        <printFLG>           501
                <001>
        <printFLG>
        <listLayout>
                <6 Frames/>
        </listLayout>
        <printFile>
                RIMG0001.JPG
                RIMG0002.JPG
                RIMG0003.JPG
                RIMG0004.JPG
                RIMG0005.JPG
                RIMG0006.JPG
        </printFile>
</printRequest>
```

FIG. 11B

```
<printRequest>
        <printFLG>           502
                <000>
        <printFLG>
        <listLayout>
                <6 Frames/>
        </listLayout>
        <printFile>
                RIMG0007.JPG
                RIMG0008.JPG
                RIMG0009.JPG
                RIMG0010.JPG
        </printFile>
</printRequest>
```

FIG. 12A
PRIOR ART

```
<printRequest>
        <listLayout>
                    <6 Frames/>
        </listLayout>
        <printFile>
                    RIMG0001.JPG
                    RIMG0002.JPG
                    RIMG0003.JPG
                    RIMG0004.JPG
                    RIMG0005.JPG
                    RIMG0006.JPG
                    RIMG0007.JPG
                    RIMG0008.JPG
                    RIMG0009.JPG
                    RIMG0010.JPG
                    RIMG0011.JPG
                    RIMG0012.JPG
                    RIMG0013.JPG
                    RIMG0014.JPG
                    RIMG0015.JPG
        </printFile>
</printRequest>
```

FIG. 12B
PRIOR ART
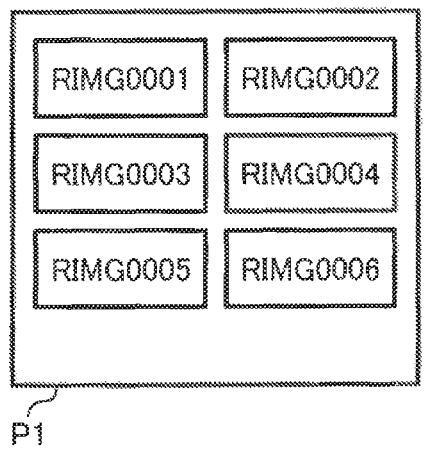
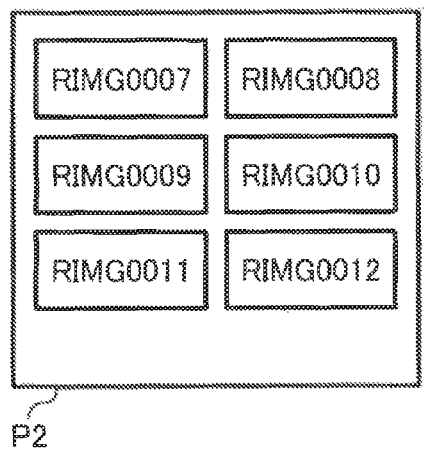
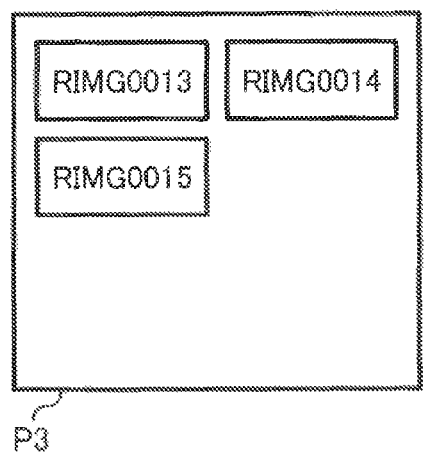

FIG. 13A
PRIOR ART

```
<printRequest>
        <listLayout>
                <6 Frames/>
        </listLayout>
        <printFile>
                RIMG0016.JPG
                RIMG0017.JPG
                RIMG0018.JPG
                RIMG0019.JPG
                RIMG0020.JPG
                RIMG0021.JPG
                RIMG0022.JPG
                RIMG0023.JPG
                RIMG0024.JPG
                RIMG0025.JPG
                RIMG0026.JPG
                RIMG0027.JPG
                RIMG0028.JPG
                RIMG0029.JPG
                RIMG0030.JPG
        </printFile>
</printRequest>
```

FIG. 13B
PRIOR ART
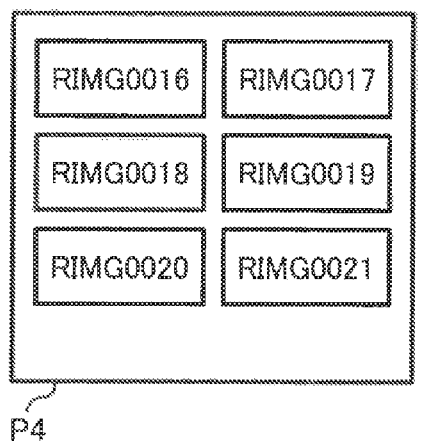
P4
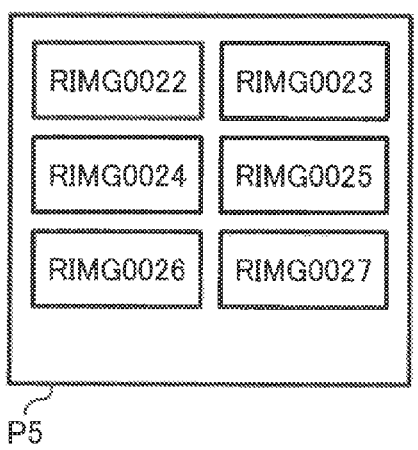
P5
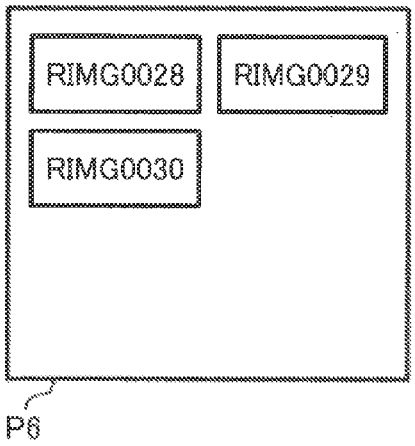
P6

IMAGE PRINTING CONTROL APPARATUS AND IMAGE PRINTING CONTROL METHOD

BACKGROUND

The present invention relates to an image printing control apparatus and an image printing control method capable of establishing a direct connection with a printing device to perform image printing of a photographed image without interposing a personal computer or the like.

Heretofore, since a digital camera has a photographing section but has no printing section, image data of a photographic object is once moved to an information processor such as a personal computer, and the printing of a photographed image is then performed by a printing device (hereinafter referred to as "printer") according to an application program or the like, which processes the image data, of the personal computer to print the photographed image.

In recent years, in order to attain easier image printing, a digital camera capable of being directly connected to the printing device and performing the printing of the photographed image without interposing the personal computer, and a system utilizing such a digital camera (hereinafter referred to as "direct printing system") have been developed.

According to the direct printing system, information related to printing processes and functions executable by a printer is notified to the digital camera, which is connected directly with the printer, by a script file of a text format. When printing the photographed image by utilizing the direct printing system, an information notifying process for the digital camera to recognize the printing processes (printing functions) executable by the printer is performed at first. Next, the digital camera presents the printing processes executable on the printer to a user (a person who handles the printing processes) in a form of menu or the like by using a display, according to the information notified from the printer. The user then selects the desired printing processes from the printing processes presented on the display.

The printing functions included in the information notified from the printer to the digital camera are, for example, a printing size of the image, a size of a printing paper, printing quality, and a layout of the printing. Besides, there is also an index printing (which prints a thumbnail image of each image) as the printing functions by which a list of the images stored in the digital camera is printable.

In the printing processes by the digital camera, "printing control information", in which the printing processes selected by the user of the digital camera who desires the printing are described, is generated, and the digital camera transfers the generated printing control information to the printer. The printer interprets control elements described in the received script file mentioned above to execute the printing processes. The digital camera, when transferring the script file to the printer, once stores the printing control information into a buffer memory included in the digital camera to perform such a communication process. The buffer memory here is a freely readable/rewritable nonvolatile memory.

In the digital camera of the direct printing system described above, when a large amount of photographed images is printed at once by the index printing for example, a size of the file becomes large since the control element information described in the script file increases according to the number of files of the photographed images specified by the user. Accordingly, it is possible to make an available size of the printing control information large if a capacity of the buffer memory used for the communication process is increased, so that a large amount of instructions for printing photographs can be handled at once. However, there is a limitation in a storage capacity of the buffer memory since the volume for implementing such a memory in the digital camera is limited. Due to the limitation in the storage capacity of the buffer memory, there is a limit in information on the image files describable in one printing control information as well.

Each FIG. 12A and FIG. 13A shows an example of description of printing control information for carrying out an index printing process, by which 6 photographed images are printed per page, by using a digital camera in which the number of image file names of the photographed images describable in one printing control information is 15 at maximum, due to the limitation in the transfer buffer capacity of the digital camera. Each FIG. 12B and FIG. 13B shows an example of the index printing outputted by the index printing process according to the printing control information of FIG. 12A and FIG. 13A, respectively. When the user photographs 30 images and executes the printing processes, since this exceeds the number of image file names describable in one printing control information, two printing control information such as those shown in FIGS. 12A and 13A are necessary.

Referring to FIGS. 12A and 13A, 15 image file names as objects to be printed are described in each of the printing control information represented therein. The image file names as the printing objects are those described between "<printFile>" to "</printFile>" such as RIMG001.JPG. Also, information (information from "<listLayout>" to "</listLayout>") representing that the printing processes are performed by using the layout in which 6 images (6 frames) are printed on one page, is included in each of the printing control information.

When the printing processes according to the printing control information shown in FIGS. 12A and 13A are performed, outputs shown in FIG. 12B and FIG. 13B can be obtained. Wherein, P1 shown in FIG. 12B represents a page primarily outputted by the printing control information shown in FIG. 12A, by which images corresponding to respective first to sixth lines of the specified image files are printed. P2 is outputted secondarily by the printing control information shown in FIG. 12A by which the images corresponding to respective seventh to twelfth lines are printed, and the page P3 is outputted thereafter. It is to be noted here that, since 6 images are printed per page according to the printing layout, the images as the printing objects outputted by the printing control information in P3 are 3 images from thirteenth to fifteenth lines, and are printed according to the layout same as those of P1 and P2.

FIG. 13B shows an example of pages outputted by the printing control information shown in FIG. 13A. Referring to FIG. 13B, P4 is a page primarily outputted by the printing control information shown in FIG. 13A, by which images corresponding to respective first to sixth lines of the image file names as the printing objects are printed. Similarly, P5 is a page printed secondarily, and P6 is a page printed thirdly. As in the page P3 shown in FIG. 12B, 3 images from thirteenth to fifteenth lines of the image file names of the printing control information shown in FIG. 13A are printed in the third page (P6) according to the printing control information of FIG. 13A. These pages P4 to P6 are outputted after the page P3 shown in FIG. 12B is outputted. Hence, such a printout is obtained as if a page break process is performed between the output P3 and the output P4. Because the number of images selected is 30 and the printing layout which prints 6 images per page is used, the printing of 30 images should be possible by 5 pages of printing areas. However, the printing processes which require 6 pages are actually performed.

A cause for the generation of the page break, which is not specified by the user, is in the above-mentioned transfer buffer capacity determined by a specification of the digital camera. Obviously, a similar phenomenon is likely to happen by a receiving buffer capacity of the printer as well.

As ways to solve this problem, increasing of the transfer buffer capacity of the digital camera, and/or increasing of the receiving buffer capacity of the printer may be considered. In this case, however, the same phenomenon occurs eventually when the number of images printed at once by the user is further increased. Hence, the increasing in the buffer capacity cannot be a fundamental solution for the problem.

In order to cope with the problem, a system which, when printing control information does not arrive from the camera to the printer within a certain period of time, judges that there is no more printing control information within the divided printing control information that is to be arrived, and executes the printing processes requested by the printing control information already arrived, is developed. However, there is a drawback in such a system that this makes the time required for completing the entire printing process long since the standby time for judging the presence of the continuing information is necessary. It is also necessary to standardize the timer conditions between both the camera and the printer, so that a limitation in a system construction increases. Further disadvantage of the system is that in the event of a failure in the printing processes, the printing processes cannot be carried out normally even when the successive printing control information is received.

SUMMARY

The present invention has been made in view of the above circumstances, and therefore, at least one objective of the present invention is to provide an image printing control apparatus and an image printing control method in which a page break unintended by a user is never outputted and unnecessary waiting time for completion of printing processes is prevented from being generated as well, in the image printing control apparatus and the image printing control method in which a direct connection with a printing device is possible to perform printing of a photographed image without interposing an information processor such as a personal computer.

To achieve these and other advantages and in accordance with the purpose of the invention, as embodied and broadly described herein, the invention provides a printing control apparatus, comprising: an image pickup unit configured to obtain an optical image representing a photographic object and converting the optical image into electrical signals; a storing unit configured to store image data represented by the electrical signals into an information recording medium; a receiver configured to receive a power value from a printing device, the power value including at least one item to be selected; a display unit configured to display the received power value; a selector configured to select at least one item in the power value and the image data to be printed; a communicator configured to transmit printing control information including said selected at least one item and the image data selected by the selector, respectively, to the printing device; and a control unit configured to control the image pickup unit, the storing unit, the receiver, the display unit, the selector and the communicator, wherein the control unit is configured to calculate the number of said image data possible to be included in the printing control information based on said at least one item selected by the selector, the image data selected by the selector and a capacity of a memory used for communication of the printing control apparatus or/and the printing device, and wherein the control unit is configured to generate at least one said printing control information according to the calculated number of said image data.

Following are preferred embodiments (1) to (6) of the printing control apparatus according to the present invention. Any combinations thereof may be considered to be preferred ones of the present invention unless any contradictions occur.
(1) The control unit is configured to transmit the plurality of generated printing control information, one by one. Alternatively, the communicator is configured to transmit the plurality of generated printing control information, one by one.
(2) The control unit is configured to designate the number of sets to be outputted for each of the selected image data, and to generate the printing control information based on the designated number of sets to be outputted of each of the selected image data.
(3) The control unit is configured to calculate the number of said image data such that the number of said image data requested for printing becomes integral multiplication of the number of images to be printed per page.
(4) The control unit is configured to add a serial number to the respective printing control information when the plurality of printing control information is generated.
(5) The control unit is configured to compute the serial number to be added to the printing control information based on the number of images targeted for printing.
(6) The control unit is configured to compute the serial number to be added to the printing control information based on the number of pages to be printed.

In addition, the present invention provides a printing control method for printing images by a printing control apparatus, wherein the printing control apparatus includes: an image pickup unit configured to obtain an optical image representing a photographic object and converting the optical image into electrical signals; a storing unit configured to store image data represented by the electrical signals into an information recording medium; a receiver configured to receive a power value from a printing device, the power value including at least one item to be selected; a display unit configured to display the received power value; a selector configured to select at least one item in the power value and the image data to be printed; and a communicator configured to transmit printing control information including said selected at least one item and the image data selected by the selector, respectively, to the printing device, the method comprising: calculating the number of said image data possible to be included in the printing control information based on said at least one item selected by the selector, the image data selected by the selector and a capacity of a memory used for communication of the printing control apparatus or/and the printing device, and generating at least one said printing control information according to the calculated number of said image data.

Following are preferred embodiments (1) to (5) of the printing control method according to the present invention. Any combinations thereof may be considered to be preferred ones of the present invention unless any contradictions occur.
(1) The printing control method further comprises transmitting the plurality of generated printing control information, one by one.
(2) The printing control method further comprises: designating the number of sets to be outputted for each of the selected image data; and calculating the number of printing control information based on the designated number of sets to be outputted of each of the selected image data.
(3) The calculating of the number of said image data calculates the number of said image data such that the number of said image data requested for printing becomes integral multiplication of the number of images to be printed per page.

(4) The generating of the printing control information computes a serial number to be added to the respective printing control information based on the number of images targeted for printing when the plurality of printing control information is generated, and adds the computed serial number to the respective printing control information.

(5) The generating of the printing control information adds a serial number to be added to the respective printing control information based on the number of pages to be printed when the plurality of printing control information is generated.

It is to be understood that both the foregoing general description and the following detailed description are exemplary, and are intended to provide further explanation of the invention as claimed.

The present application is based on and claims priority from Japanese application No. 2005-058743, filed Mar. 3, 2005, and Japanese application No. 2005-350197, filed Dec. 5, 2005, the disclosures of those are hereby incorporated by reference herein in their entirety.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 4A to 4C are examples of description of printing control information generated by the printing control apparatus according to the present invention.

FIGS. 6A to 6C are other examples of description of the printing control information generated by the printing control apparatus according to the present invention.

FIGS. 7A and 7B are yet other examples of description of the printing control information generated by the printing control apparatus according to the present invention.

FIGS. 9A and 9B are yet other examples of description of the printing control information generated by the printing control apparatus according to the present invention.

FIGS. 11A and 11B are yet other examples of description of the printing control information generated by the printing control apparatus according to the present invention.

FIG. 12A is an example of printing control information generated by a conventional printing control method, and FIG. 12B is an example of outputs outputted according to the generated printing control information.

FIG. 13A is an example of printing control information generated by a conventional printing control method, and FIG. 13B is an example of outputs outputted according to the generated printing control information.

DESCRIPTION OF THE PREFERRED EMBODIMENTS

Figure 1:
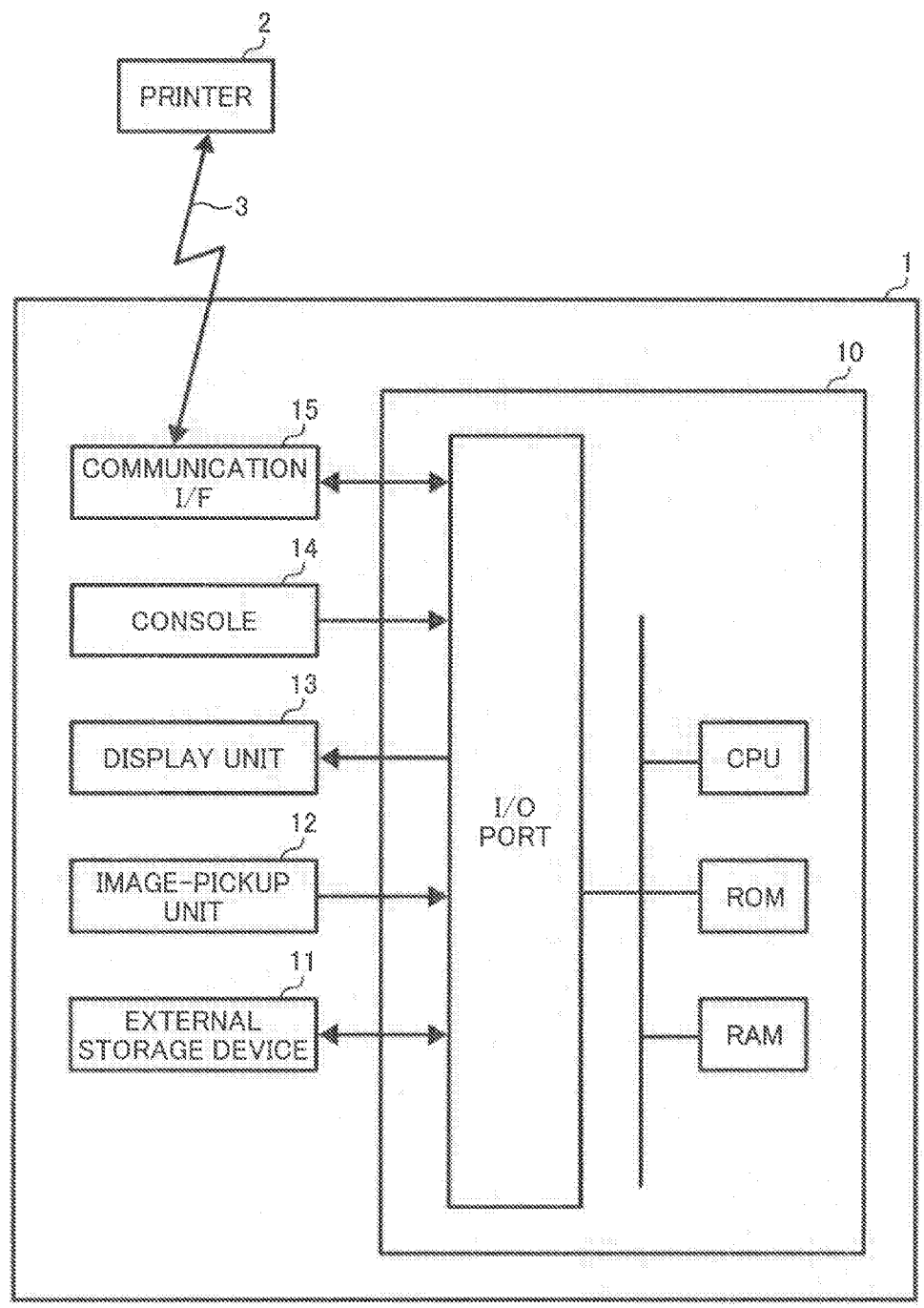
FIG. 1 is a schematic block diagram showing an example of a digital camera which operates as a printing control apparatus according to the present invention.

Reference will now be made in detail to the present preferred embodiments of the invention, examples of which are illustrated in the accompanying drawings. Wherever possible, the same reference numbers are used in the drawings and the description to refer to the same or like parts. The scope of the present invention, however, is not limited to these embodiments. Within the scope of the present invention, any structure and material described below can be appropriately modified.

FIG. 1 is a block diagram schematically showing a structure of a digital camera as an example of a printing control apparatus according to the present invention.

First Embodiment

Referring to FIG. 1, the digital camera 1 includes: an external storage device 11 for storing photographed images, an image-pickup unit 12 having lenses, a driving system for the lenses, a CCD (Charge-Coupled Device), an AD (Analog/Digital) converter and so on; a display unit 13 for displaying various information necessary for photographing operation, various setting information used for photographing processes of the digital camera 1 and so on; a console 14 used for the photographing operation, operation of setting related to the photographing processes and so on; a communication I/F (Interface) 15 for controlling an interface with a printer 2; and an integral control unit 10 having a CPU (Central Processing Unit) for controlling the entire digital camera, a ROM, a RAM, an input/output port (I/O port) and a bus line connecting the CPU, the ROM, the RAM and the I/O port. The external storage device 11 here is, for example but not limited to, a Compact Flash (registered trademark), a memory card, a SmartMedia (registered trademark), or the like. The integral control unit 10 is a microcomputer although it is not limited thereto.

The communication I/F 15 of the digital camera 1 establishes connection with the printer 2 through a communicator 3 so that a communication is possible between the digital camera 1 and the printer 2. Any communicator can be used for the communicator 3 here regardless of whether the communicator is based on wired or wireless communication. One of examples of the wired communicator is an USB (Universal Serial Bus) which is in widespread use, although the present invention is not limited thereto. Some examples of the wireless communicator are Bluetooth, Wi-fi (wireless Local Area Network standard), IrDA (Infrared communication) that are widely used short-distance wireless communication method. The Internet may be utilized as the communicator 3 as a long-distance wireless communication method.

The ROM is a nonvolatile memory such as a flash memory for storing processing procedures (program) executed by the CPU. The image processing control method according to the present invention is implemented by the program stored in the ROM. The RAM functions as a communication buffer memory, which will be described later, in addition to a function as a work area used when the CPU executes the program.

Before direct image printing is performed, the digital camera 1 is first connected to the printer 2, and a communication channel is established between the digital camera 1 and the printer 2 after the physical connection is done. Thereafter, a printing control program stored in the ROM of the integral control unit 10 in the digital camera 1 is launched. The digital camera 1 operates as the printing control apparatus when the printing control program is launched.

The printing control program, at first, requests the printer 2 to transmit a power value. The power value here is a text file described in a predefined script format representing contents of printing processes executable by the printer 2 (items to be selected). For example, information on a size of paper usable in the printer 2, a layout, printing conditions (such as print a date as well, print a name of photographed image as well, etc.), and information which represents the number of images printable in index printing (i.e. items), are described in the power value.

The digital camera 1, after receiving the power value, displays information selectable as printing process conditions on the display unit 13, based on the power value. A user designates, for example, a desired output size, an output mode (or output format), and the image to be outputted, from the printing processes displayed on the display unit 13. The information specified by the user here are defined as printing conditions.

Figure 2:
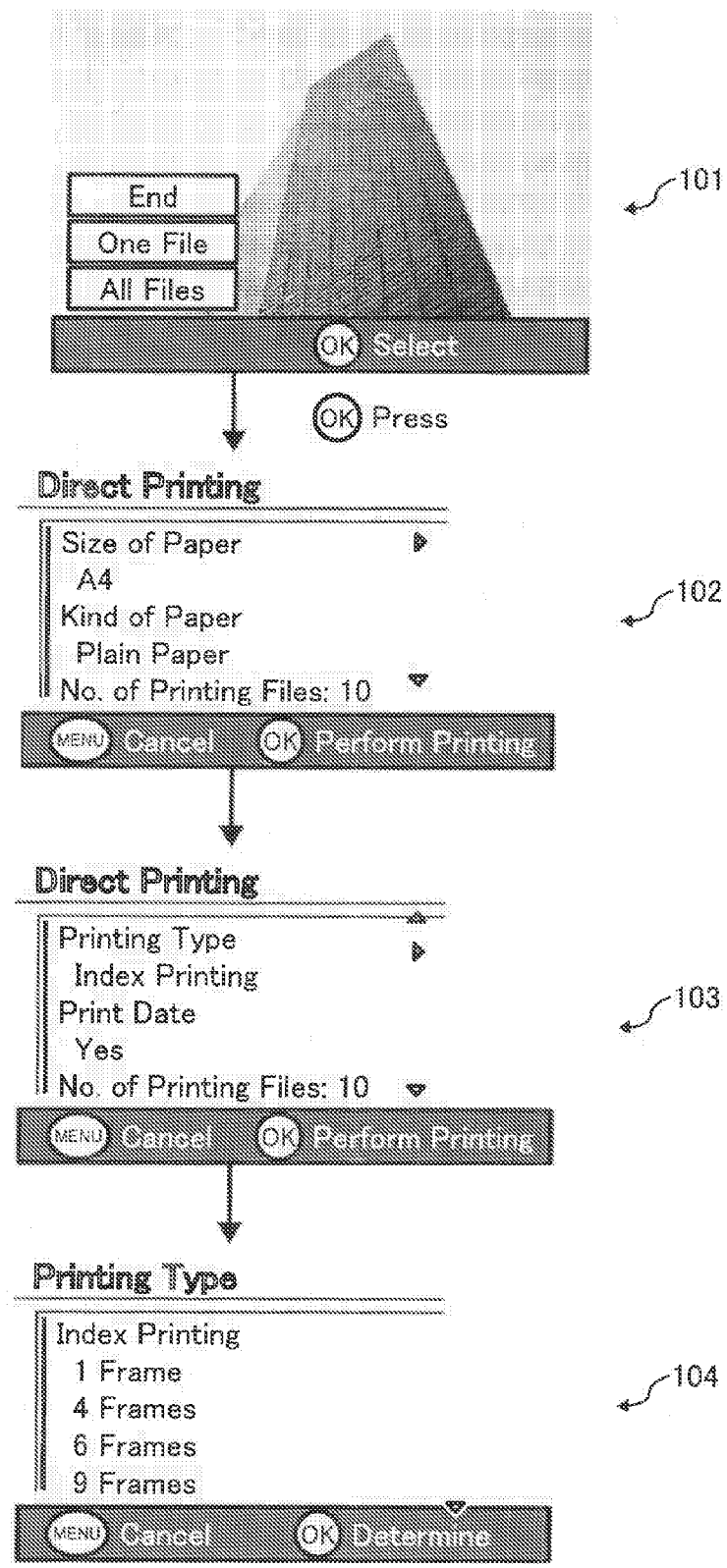
FIG. 2 is an example of screen pages for setting printing conditions in a printing control method according to the present invention.

FIG. 2 is an example of screen pages displayed on the display unit 13. A screen page 101 is an initial setting screen for selection of the printing conditions, in which designation of "one file" (individual designation of the image files) or "all files" (collective designation of the image files) of image files as an object to be printed in the printing processes is selectable.

The operation for selecting "one file" or "all files" of the image files can be performed by manipulating the console 14. When the console 14 is operated to select "all files" and operation of pressing an "OK" button is carried out in the state that the screen page 101 is displayed, a printing condition setting screen 102 is then displayed on the display unit 13. The size of paper and a kind of paper are selected in the printing condition setting screen 102 by operating the console 14.

In a subsequent screen 103, the console 14 is operated to select "printing type" and "date/time printing". When the number of reduced images (hereinafter referred to as "the number of frames") to be printed per page is designated and then the "OK" button is pressed in a screen 104, the setting for the printing conditions completes. Accordingly, the printing conditions, which the user desires, are selected in each of the selection screens displayed on the display unit 13 of the digital camera 1 to decide the printing process conditions in the printing.

Figure 3:
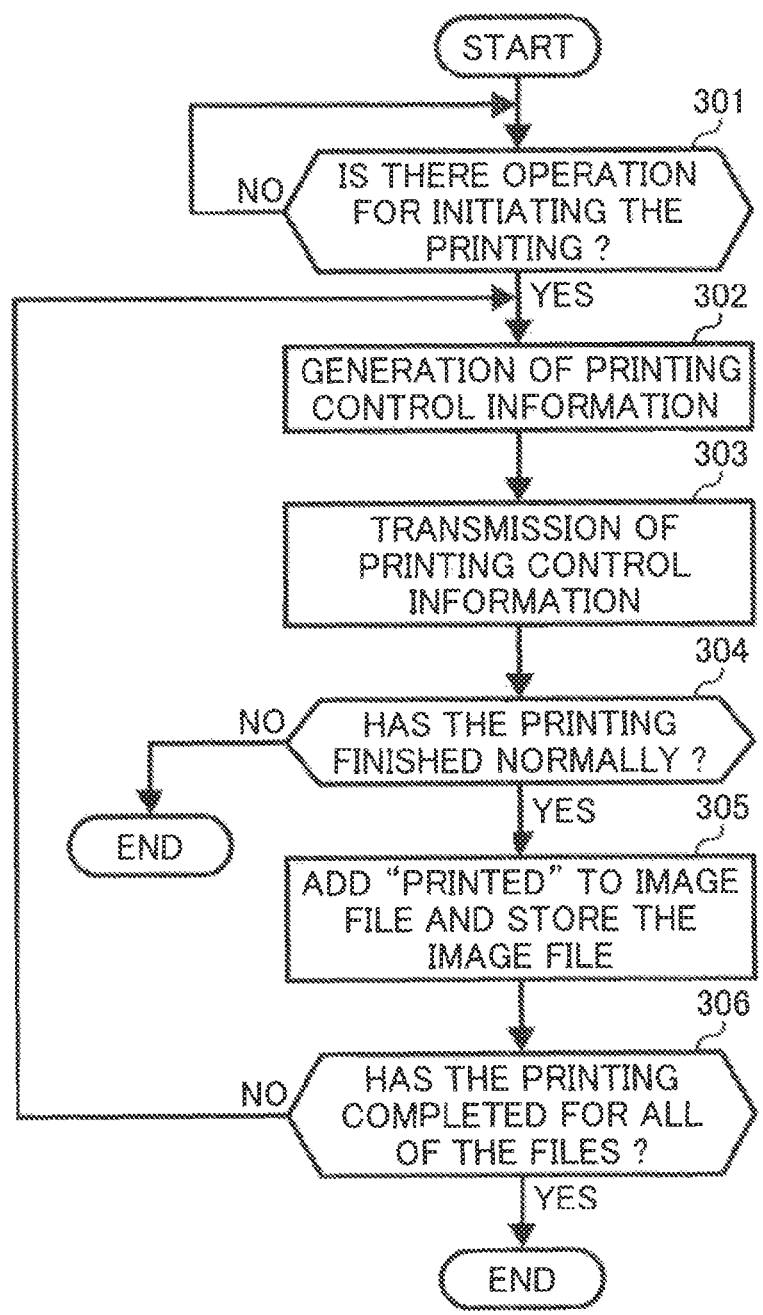
FIG. 3 is a flowchart representing an example of processes in the printing control according to the present invention.

Now, a detailed description on the printing processes carried out by the digital camera 1 after the above-described printing conditions are decided will be given below with reference to a flowchart shown in FIG. 3. Referring to FIG. 3, each step of processes is represented as (301), (302), and so on. In the present embodiment, the maximum number of image files describable in one printing control information determined by a limitation in a communication buffer is supposed and defined as 15.

The printing processes are initiated when the above-described printing conditions are decided (301). Then, one or more printing control information is generated according to the output format, the image to be outputted and so on designated by the selecting operation in each of the printing condition setting screens explained already (302). Here, the description is given on the assumption that the "index printing" (the format which prints a plurality of reduced images on one page) is specified for the output format, and "all files" is specified in the images to be printed in the above-described operation of the printing condition setting.

When the printing control information generated based on the above-described conditions is transmitted to the printer 2 (303), the printer 2 executes the printing processes in line with the printing conditions described in the printing control information. The printer 2 sends a result of the execution of the printing processes (printing result information) to the digital camera 1. The digital camera 1 stops the printing processes when the received printing result information indicates "abend", to end the printing processes.

When the printing result information indicates "normal end", the digital camera 1 adds a "printing completion flag" to the image files to which the printing is carried out by the printing control information, and stores the image file with the printing completion flag in the RAM.

Subsequently, when there is the image file to which the printing processes are not completed (N in step 306), the processes are performed again to the uncompleted image file from the step 302. The above-described processes are repeated until the printing processes for all of the images to be printed are completed. The printing processes end completely when the printing processes for all of the images to be printed complete.

Figure 4B:
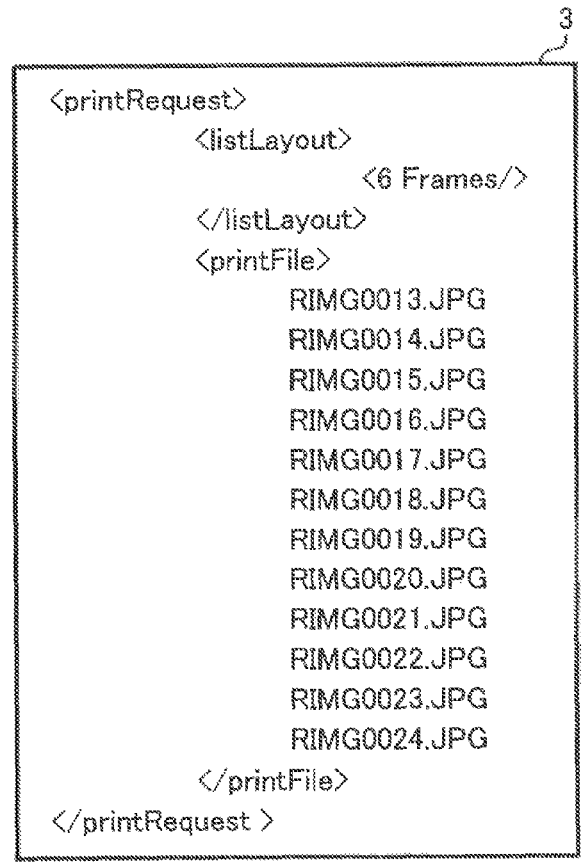
Figure 4C:
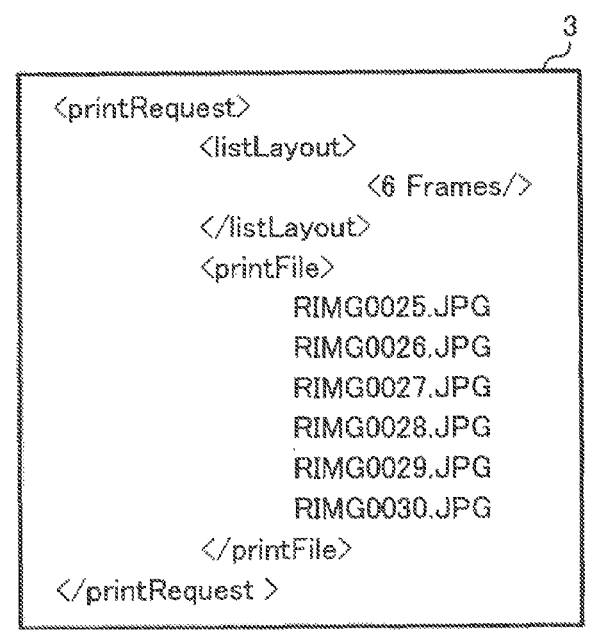
Figure 5:
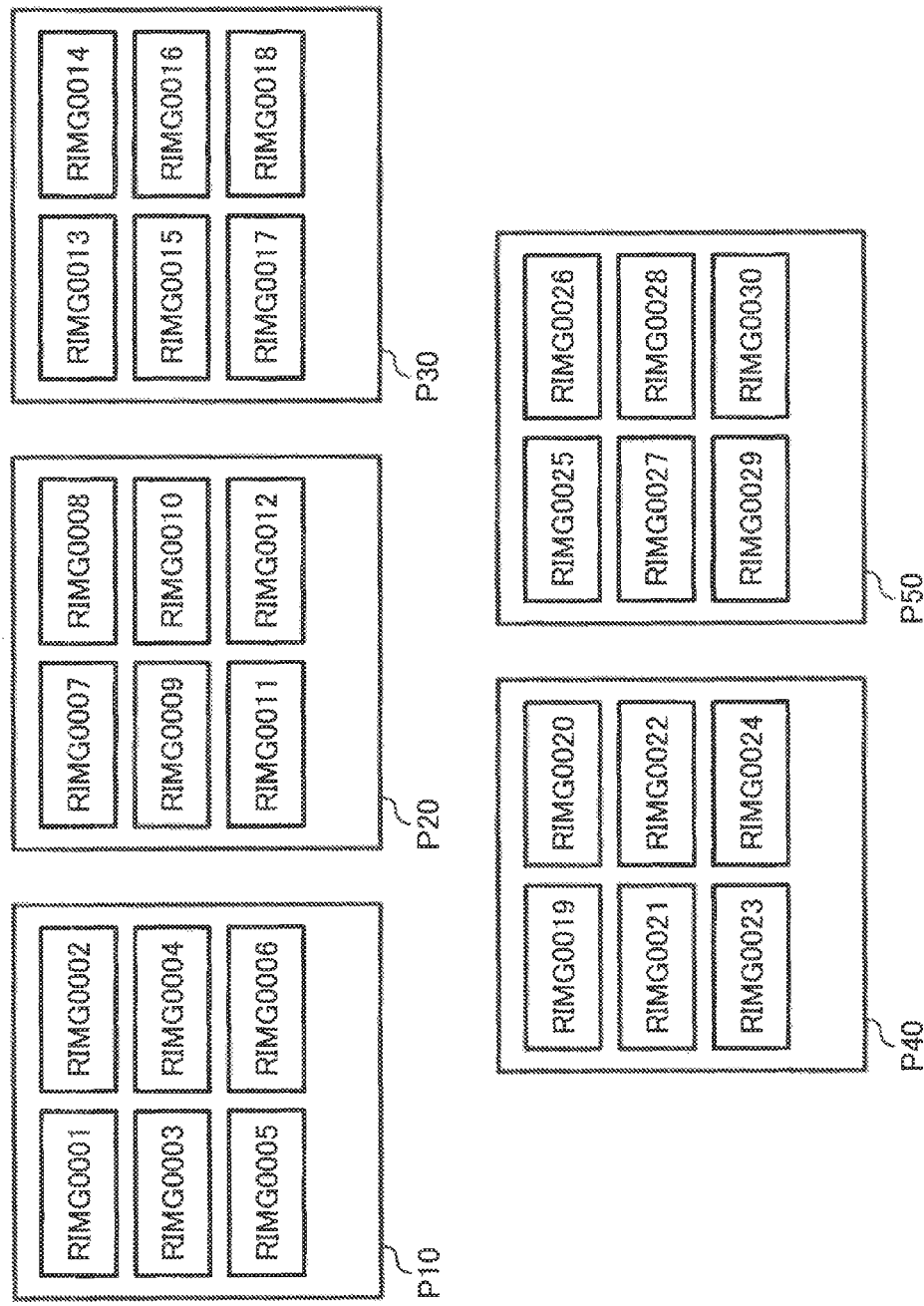
FIG. 5 is a schematic diagram showing outputs by the printing control method according to the present invention.

FIGS. 4A to 4C are examples of description of the printing control information generated in the step 302 of the printing processes. FIG. 5 is an example of outputs of the printing control information shown in FIGS. 4A to 4C. The printing control information 3 includes an information identifier 70 representing that the file is the printing request, a layout identifier 71 representing that the printing processes are the "index printing", and a file identifier 72 which represents the image files as the objects to be printed.

In order to output the images in such a manner that an unnecessary page break is not included therein in the digital camera in which the number of image file names describable in one printing control information is 15 at maximum, when supposing that the layout selected by the user is "index printing (6-frame printing)" and the number of images to be printed is "30 images", the number of printing control information to be generated is decided according to the following calculation.

As already described in the foregoing, the number of images describable in one printing control information is limited due to the limitation in a storage capacity of the communication buffer.

It is possible to acquire a value obtained by:

$$n \times Y$$

as the number of image files describable in one printing control information, by defining that X is the number of the image files processable in a single printing request, i.e. the number of image files describable in the file identifier 72 of one printing control information, Y is the number of images (the number of frames) printable per page, and n is a value in which X is divided by Y ($X \div Y$), wherein a number after the decimal point in n is truncated.

According to the present embodiment, since X is 15 and Y is 6, 2.5 is obtained by $X \div Y$, wherein a number after the decimal point of thus obtained 2.5 is truncated to obtain 2 in n. Here, the number of frames that the user selects is 6, so that $n \times 6$, i.e., 12 is acquired. Therefore, if 12 image files are described in one printing control information, it is possible to perform the printing processes without any intrusion of the unnecessary page break thereto by the calculation.

FIGS. 4A to 4C are examples of printing control information generated according to the result of the above-described calculation, and FIG. 5 is the example of outputs printed by the printing control information shown in FIGS. 4A to 4C. Supposing that the printing processes are performed according to the similar conditions mentioned above without performing the above calculation, 6 pages of outputs would be obtained. On the contrary, the printing processes performed on the basis of the above-described calculation according to the embodiment of the present invention can be completed with 5 pages.

Therefore, it is possible to perform the printing processes without incorporating the unnecessary page break even when the number of images to be printed is larger than the number of images printable in one page defined by the printing layout, by carrying out the printing processes in which the above-described calculation process is utilized.

Another example according to the above calculation will be given below. In this example, it is supposed that the number of images X describable in one printing control information is 320 images, and the number of printing frames per page selected is 9. Here, 320÷9=35.555, so that n is 35. Therefore, 315 is acquired by n×Y, i.e. 35×9. Thus, the number of image files to be described in one printing control information is 315.

When the user requests the printing of 1000 images in the above-described another example, each printing control information is generated by describing 315 images therein, so that a total of 4 times of generation process of the printing control information are required to be performed. Therefore, the image files to be described in the initial printing control information are from the first to 315th images among the 1000 images to be printed, and image files to be described in the second printing control information are from 316th to 630th images, and the image files to be described in the third printing control information are from 631st to 945th images. Finally, the printing control information targeting the remaining 55 images is generated to complete the printing processes. Thereby, all of the image printing complete without the unnecessary page break being inserted therein.

According to the embodiment of the present invention, the maximum number of images to be described in one printing control information is obtained from the communication buffer capacity of the digital camera 1 and/or the printer 2, the number of frames decided by the layout selected by the user, and the number of image files to be printed selected by the selecting operation of the user. The number of the printing control information to be generated is then decided based on the maximum number of images to be described in one printing control information obtained, and thereby the decided number of printing control information is generated. Therefore, it is possible to perform the printing processes without incorporation of the unwanted page break.

Second Embodiment

Next, a second embodiment according to the present invention will be described with reference to FIGS. 6A to 6C. According to the present embodiment, the printing processes are similar to those described in the first embodiment, in which the layout that 6 images (6 frames) are printed per page is selected by the user. In the second embodiment, however, 4 kinds of images are specified as the printing objects, and a plurality of copies of printing is set for each kind of images. As shown in FIG. 6A, 4 copies of the image file "RIMG0001.jpg", 6 copies of the image file "RIMG0002.jpg", 8 copies of the image file "RIMG0003.jpg", and 6 copies of the image file "RIMG0004.jpg" are set to be the printing objects.

Now, the number of printing control information generated for executing the printing according to the above conditions is decided by utilizing the method described in the first embodiment. Although the number of images is 4, it is necessary to calculate the total number of images, due to the designation of the number of sets. Accordingly, the total number of images to be printed of 24 is obtained by the calculation: 4+6+8+6=24 images. Since n=2 and Y=6, 12 images can be described in one printing control information. Therefore, the number of printing control information generated in the present embodiment is obtained by the calculation: 24÷12=2, so that two printing control information should be generated.

Next, the first printing control information A is generated. As described above, up to 12 images can be described in one printing control information. It is to be noted here that when the image files are described in order of designation of the image files, it can be distinguished that the number of image files exceeds 12 if the image file of "RIMG0003.jpg" is described as 8 copies in the first printing control information A. Accordingly, the number of copies of "RIMG0003.jpg" is reduced until the total number of image files in the first printing control information A reaches 12 images, and the remaining copies of "RIMG0003.jpg" are described in the second printing control information B. Examples of thus generated printing control information are shown in FIGS. 6B and 6C, respectively.

Third Embodiment

Figure 8:
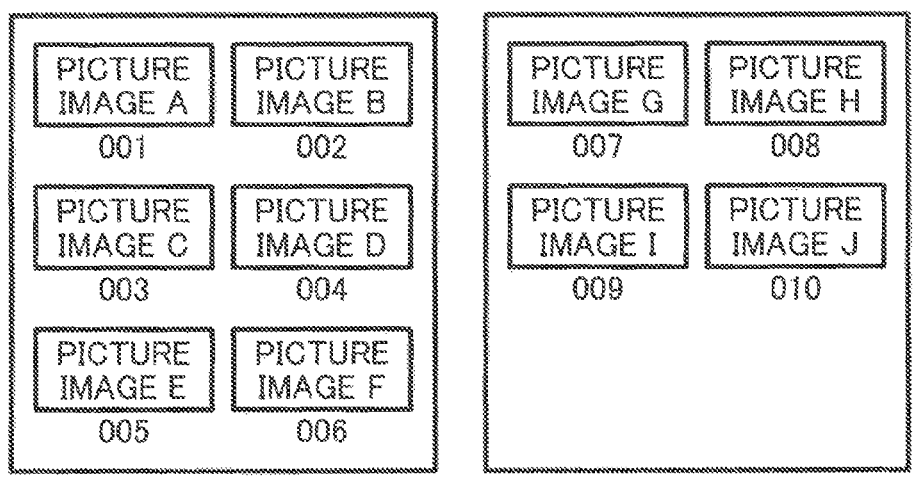
FIG. 8 is another schematic diagram showing outputs by the printing control method according to the present invention.

Next, a third embodiment of the present invention will be described with reference to FIGS. 7A to 8. The examples shown in FIGS. 7A to 8 are the printing control information wherein the number of images to be printed selected by the selecting operation of the user is 10, and wherein the layout printing, in which 6 frames are printed per page, is selected by the user, as similar to the above-described first and second embodiments. In other words, in the present embodiment, the printing processes are processed in twice since two printing control information are generated.

Referring to FIGS. 7A and 7B, the printing control information are divided by an identifier 401 comprising information sandwiched by <printNO> and </printNO>. The printing request according to the printing control information divided by the identifier 401 of FIG. 7A represents that the printing from the first image file to the image file of predetermined number as the objects to be printed is described therein. Similarly, referring to FIG. 7B, the printing request according to the printing control information by an identifier 402 represents that the printing starts from the seventh image file as the printing object.

FIG. 8 illustrates the printed images according to the printing information shown in FIGS. 7A and 7B. Referring to FIG. 8, a serial number for the image files is printed below the printed images. Accordingly, the printer 2 is possible to add the serial number to each of the images and print the images with the corresponding serial number according to the information described in the received printing control information. In the third embodiment of the present invention, the information equivalent to the serial number of the image files is described as the <printNO> to generate the printing control information, so that the <printNO> of the printing control information, which instructs the second printing processes equivalent to the second page of the printing outputted by the printing processes, is "007".

Fourth Embodiment

Figure 10:
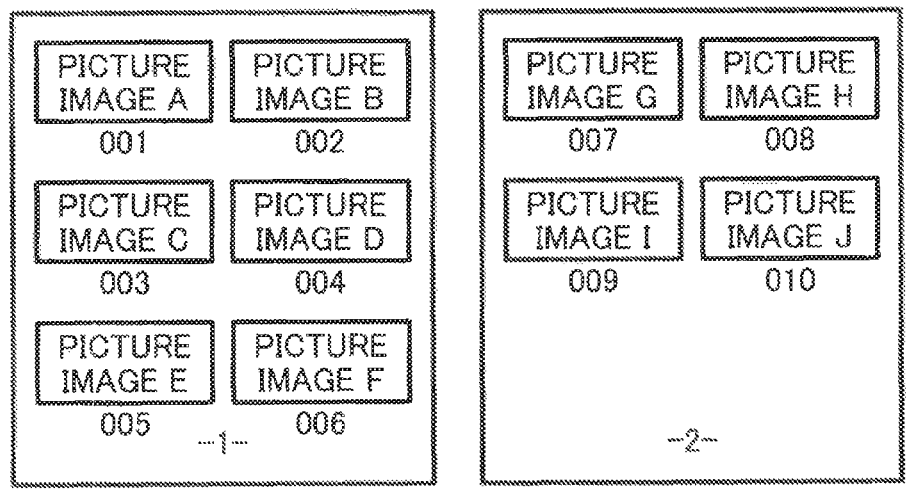
FIG. 10 is another schematic diagram showing outputs by the printing control method according to the present invention.

Next, a fourth embodiment of the present invention will be described with reference to FIGS. 9A to 10. As similar to the third embodiment, the examples shown in FIGS. 9A to 10 are the printing control information in which the number of images to be printed selected by the selecting operation of the user is 10, and in which the layout printing, wherein 6 frames are printed per page, is selected by the user. In other words, the printing processes are processed in twice since two printing control information are generated in the present embodiment.

As shown in FIGS. 9A and 9B, in the printing control information generated according to the present embodiment, information synchronized with a page number to be printed are specified in <pageNO> by identifiers 403 and 404. Accordingly, the printing control information are generated by using the <pageNO> for the identifiers when the page number is to be inserted in the printing processes. Therefore, the printer, which processes the printing control information, can recognize for which page the printing is being carried out.

Also, according to the present embodiment, it is possible to perform the printing in which the page number is added. FIG. 10 shows examples of the layout printing to which the page number is added by the printing control information shown in FIGS. 9A and 9B. As shown in FIG. 10, it is possible to perform the printing by adding the page number to each of the pages based on the information described in the printing control information received by the printer 2. In the present embodiment, the information equivalent to the page number is described as <pageNO> to generate the printing control information. Hence, the <pageNO> of the printing control information, which instructs the second printing processes equivalent to the second page of the printing outputted by the printing processes, is "002".

Fifth Embodiment

Next, a fifth embodiment of the present invention will be described with reference to FIGS. 11A and 11B. As similar to the third embodiment, the number of images to be printed, specified by the user, is 10, and the printing processes are implemented in twice by the generation of two printing control information.

Referring to FIGS. 11A and 11B, it is possible to judge that there are subsequent printing processes after the printing processes, by describing an identifier 501 which represents divisional processes in the printing control information and then generating the printing control information. For example, when defining that the printing control information, in which <001> is described in <printFLG> as the identifier 501, indicates that there is other printing control information which instructs the subsequent printing processes, and defining that <000> is described in <printFLG> of the identifier 501 of the printing control information if the successive printing request completes thereby, so as to decide the processing conditions beforehand by those, the printer 2 is possible to judge whether or not there is the subsequent printing request. Here, when the subsequent printing does not exist from the beginning, the <printFLG> itself is not described.

As described in the foregoing, it is possible that each of the first to fifth embodiments of the invention is used independently to efficiently perform the image printing processes for eliminating the unnecessary page break. However, it is also possible to obtain similar or better effects when two or more embodiments described above are combinedly used.

In addition, the present invention is also applicable to a printing control program for the printer.

Although the exemplary embodiments of the present invention have been described in the foregoing, it is to be noted that the image printing control apparatus and the image printing control method according to the present invention are not limited to the digital camera as explained in the embodiments. The image printing control apparatus and the image printing control method according to the present invention are also applicable to a portable information terminal apparatus such as a so-called PDA (Personal Data Assistant), a portable cellular phone and so on, in which a camera function is incorporated. Such a portable information terminal apparatus has an appearance slightly different from the digital camera but generally includes functions and a configuration similar to those of the digital camera. It is therefore possible that the image printing control apparatus and the image printing control method according to the present invention are employed in the portable information terminal apparatus.

Accordingly, the image printing control apparatus and the image printing control method of the present invention at least have the following advantages:

1. The appropriate printable number of images is calculated based on the number of image data per one page decided by the selected printing conditions and the number of image data designated in the printing, and one or more printing control information is generated based on the calculated number of images printable. Therefore, it is possible to perform the printing without incorporation of the unwanted page break even when the number of image data designated for the printing is increased and thereby the printing based on the plurality of printing control information is performed.

2. Even when the serial number or/and the page number is added to the printing control information divided into several so as to insert the serial number in the images to be printed, the normal addition of the serial number or/and the page number thereto is possible.

3. The present invention makes it possible to generate the appropriate printing control information only in the digital camera side. Therefore, it is possible to use the printer of general purpose, so that reduction in limitation in a system construction is attained.

Although the present invention has been described in terms of exemplary embodiments, it is not limited thereto. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A printing control apparatus, comprising:
   an image pickup unit configured to obtain an optical image representing a photographic object and converting the optical image into electrical signals;
   a storing unit configured to store image data represented by the electrical signals into an information recording medium;
   a receiver configured to receive a power value from a printing device, the power value including at least types of a layout to be selected;
   a display unit configured to display the received power value;

a selector configured to select at least a type of the layout in the power value and the image data to be printed;

a communicator configured to transmit printing control information including filenames of the image data selected by the selector to the printing device; and a control unit configured to control the image pickup unit, the storing unit, the receiver, the display unit, the selector and the communicator, wherein the control unit is configured to calculate a number of the filenames of said image data to be included in the printing control information based on the type of the layout selected by the selector, and a capacity of a memory used for communication of the printing control apparatus or/and the printing device, and wherein the control unit is configured to generate at least one said printing control information according to the calculated number of the filenames of said image data and the image data selected by the selector.

2. The printing control apparatus according to claim 1, wherein the control unit is configured to transmit a plurality of generated printing control information, one by one.

3. The printing control apparatus according to claim 1, wherein the control unit is configured to designate a number of sets to be outputted for each of the selected image data, and to generate the printing control information based on the designated number of sets to be outputted of each of the selected image data.

4. The printing control apparatus according to claim 1, wherein the control unit is configured to calculate the number of the filenames of said image data to be included in the printing control information such that the number of the filenames of said image data becomes an integer multiple of a number of images to be printed per page.

5. The printing control apparatus according to claim 1, wherein the control unit is configured to add a serial number to the respective printing control information when a plurality of printing control information is generated.

6. The printing control apparatus according to claim 5, wherein the control unit is configured to compute the serial number to be added to the printing control information based on a number of images targeted for printing.

7. The printing control apparatus according to claim 5, wherein the control unit is configured to compute the serial number to be added to the printing control information based on a number of pages to be printed.

8. A printing control method for printing images by a printing control apparatus, wherein the printing control apparatus includes:

an image pickup unit configured to obtain an optical image representing a photographic object and converting the optical image into electrical signals;

a storing unit configured to store image data represented by the electrical signals into an information recording medium;

a receiver configured to receive a power value from a printing device, the power value including at least types of layout to be selected;

a display unit configured to display the received power value;

a selector configured to select at least a type of the layout in the power value and the image data to be printed; and a communicator configured to transmit printing control information including filenames of the image data selected by the selector, to the printing device, the method comprising:

calculating a number of the filenames of said image data to be included in the printing control information based on the type of the layout selected by the selector, and a capacity of a memory used for communication of the printing control apparatus or/and the printing device, and generating at least one said printing control information according to the calculated number of the filenames of said image data and the image data selected by the selector.

9. The printing control method according to claim 8, further comprising:

transmitting a plurality of generated printing control information, one by one.

10. The printing control method according to claim 8, further comprising:

designating a number of sets to be outputted for each of the selected image data; and calculating the number of printing control information based on the designated number of sets to be outputted of each of the selected image data.

11. The printing control method according to claim 8, wherein the calculating of the number of the filenames of said image data to be included in the printing control information calculates the number of the filenames of said image data such that the number of the filenames of said image data becomes an integer multiple of a number of images to be printed per page.

12. The printing control method according to claim 11, wherein the generating of the printing control information computes a serial number to be added to the respective printing control information based on a number of images targeted for printing when a plurality of printing control information is generated, and adds the computed serial number to the respective printing control information.

13. The printing control method according to claim 11, wherein the generating of the printing control information adds a serial number to be added to the respective printing control information based on a number of pages to be printed when the plurality of printing control information is generated.

14. The printing control apparatus according to claim 1, wherein a maximum number of the filenames of the image data that can be included in one printing control information is determined by said capacity of the memory, and the number of the filenames of said image data to be included in the printing control information is calculated based on a number of the image data that is printable per page in the selected type of the layout, and a maximum number of the image data that can be included in one printing control information.

15. The printing control apparatus according to claim 14, wherein the number of the filenames of said image data to be included in the printing control information is calculated by dividing the maximum number of the filenames of the image data that can be included in one printing control information by the number of the image data that is printable per page in the selected type of the layout to obtain an integer value of the division, and by multiplying the number of the image data that is printable per page in the selected type of the layout with the integer value.

16. The printing control method according to claim 8, further comprises:

determining a maximum number of the filenames of the image data that can be included in one printing control information by said capacity of the memory, wherein the calculating the number the filenames of said image data to be included in the printing control information based on a number of the image data that is printable per page in the selected type of the layout, and a maximum number of the image data that can be included in one printing control information.

17. The printing control method according to claim 16,
wherein the calculating of the number of the filenames of said image data to be included in the printing control information by dividing the maximum number of the filenames of the image data that can be included in one printing control information by the number of the image data that is printable per page in the selected type of the layout to obtain an integer value of the division, and by multiplying the number of the image data that is printable per page in the selected type of the layout with the integer value.

* * * * *